Feb. 20, 1962  J. J. HENRY  3,021,808
SHIP
Filed May 7, 1956  9 Sheets-Sheet 1
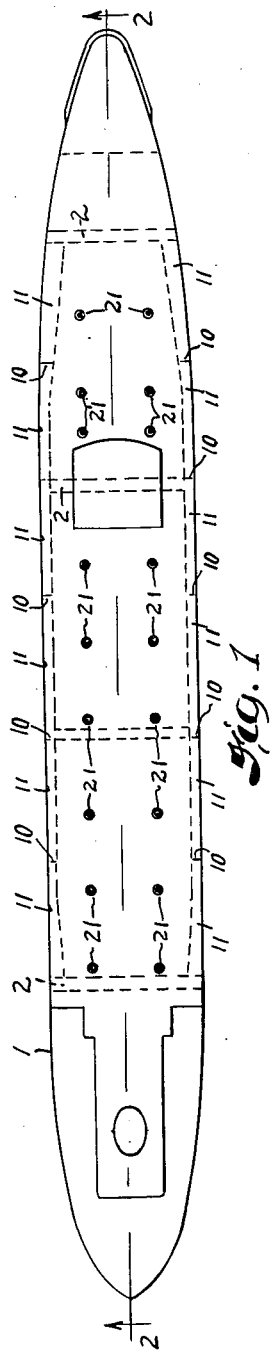
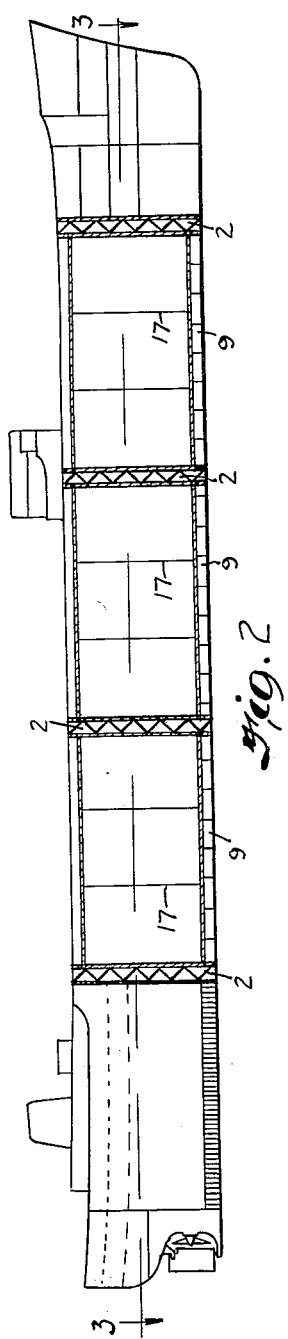
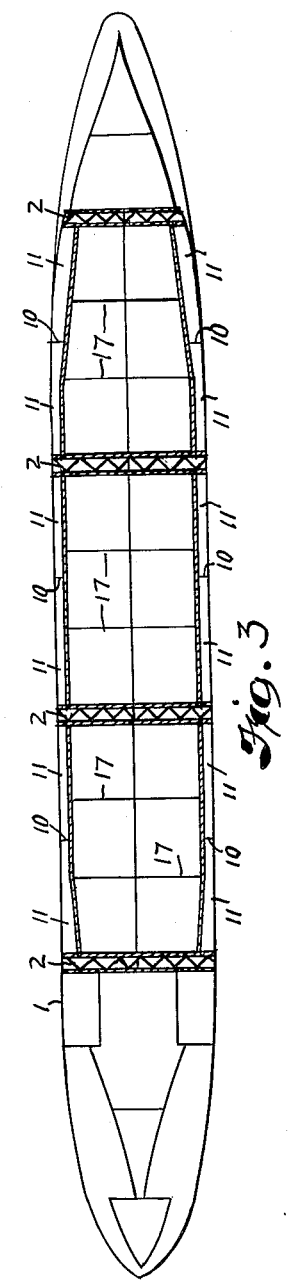
INVENTOR.
JAMES J. HENRY
BY
Oberlin & Limbach
ATTORNEYS.

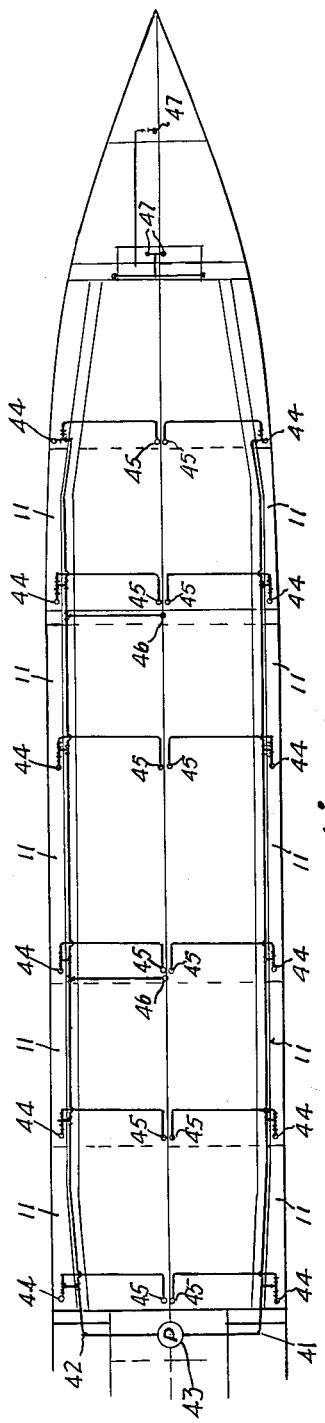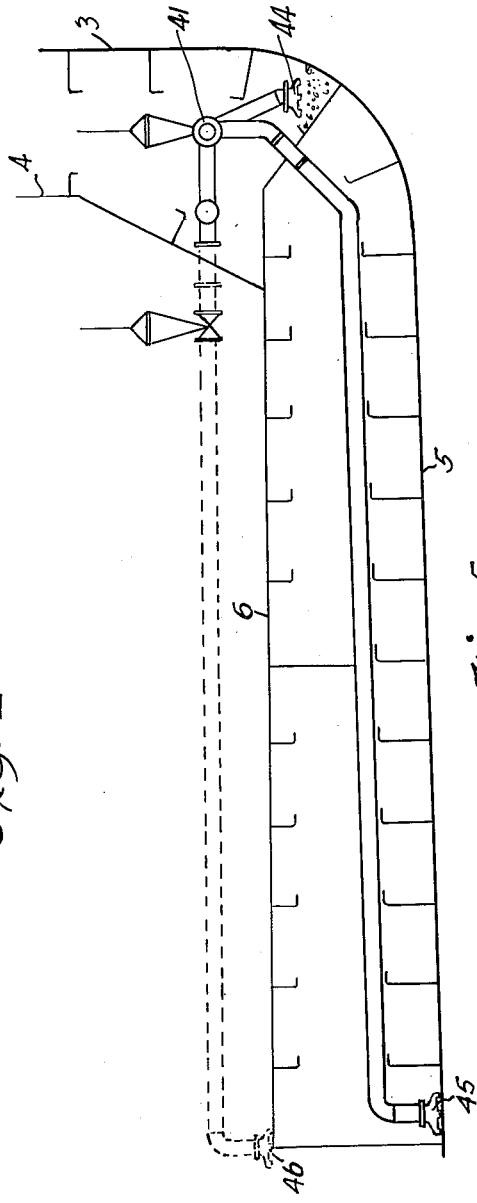

Feb. 20, 1962 J. J. HENRY 3,021,808
SHIP
Filed May 7, 1956 9 Sheets-Sheet 3
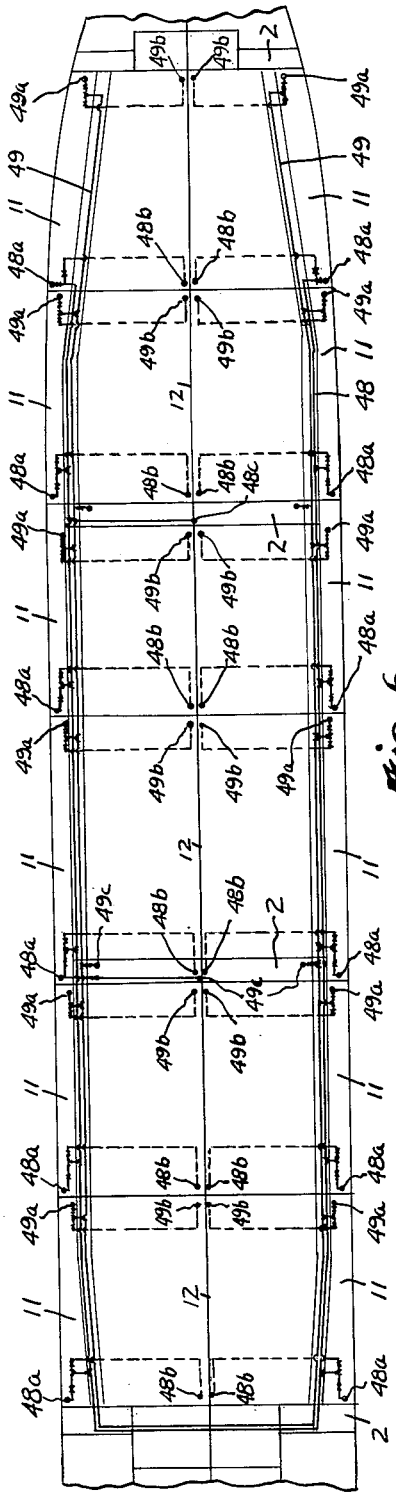
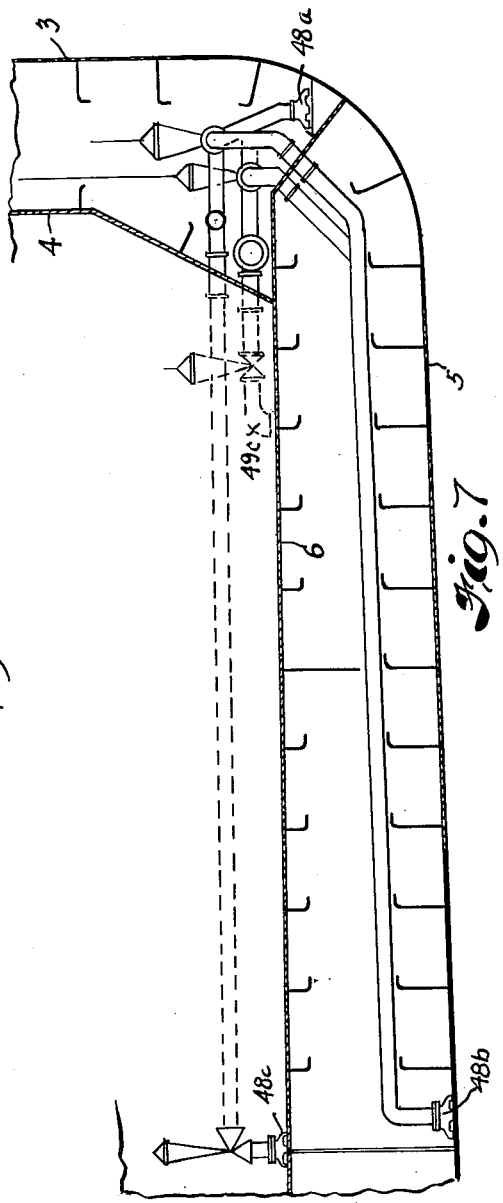
INVENTOR.
JAMES J. HENRY
BY
Oberlin & Limbach
ATTORNEYS.

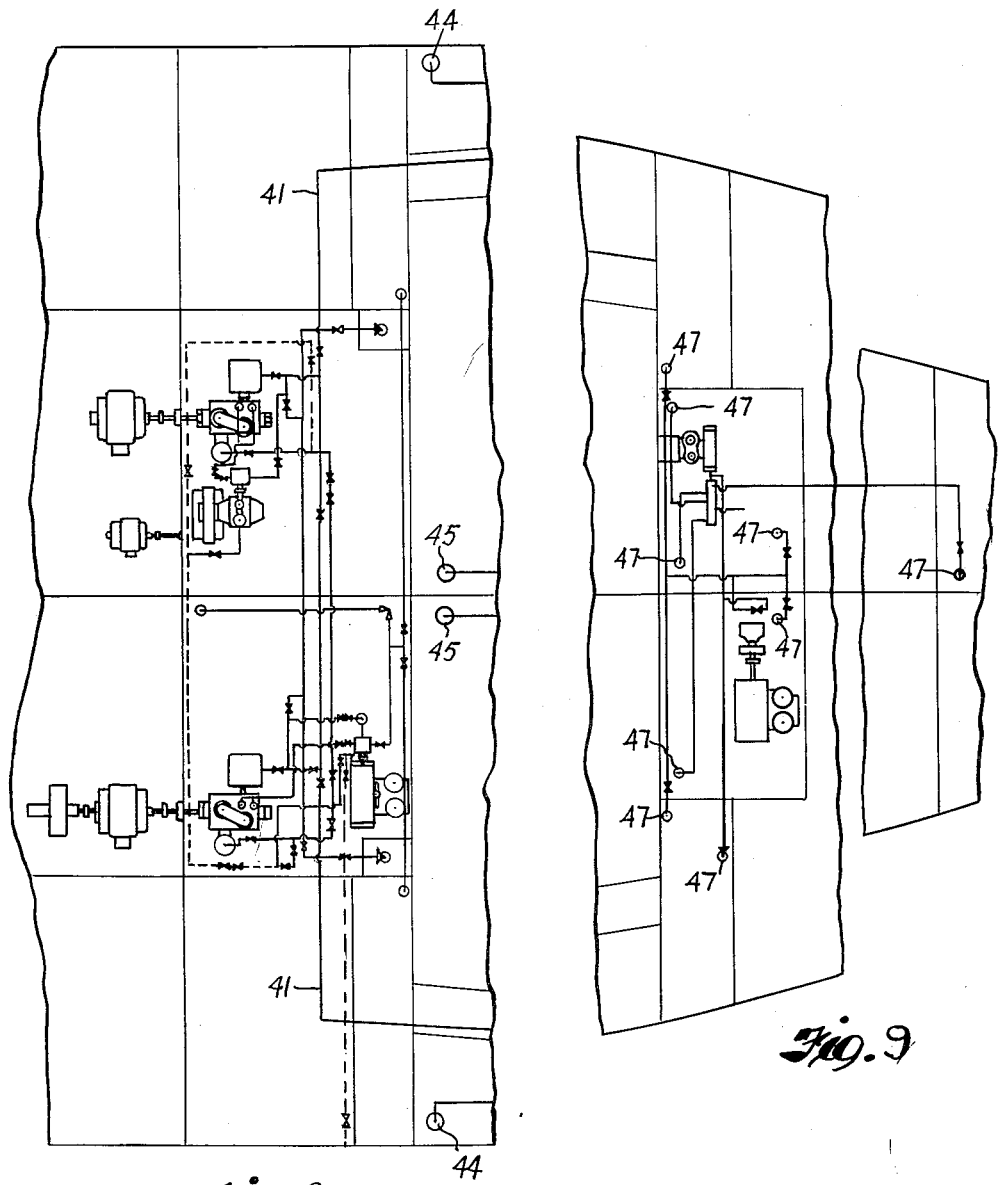

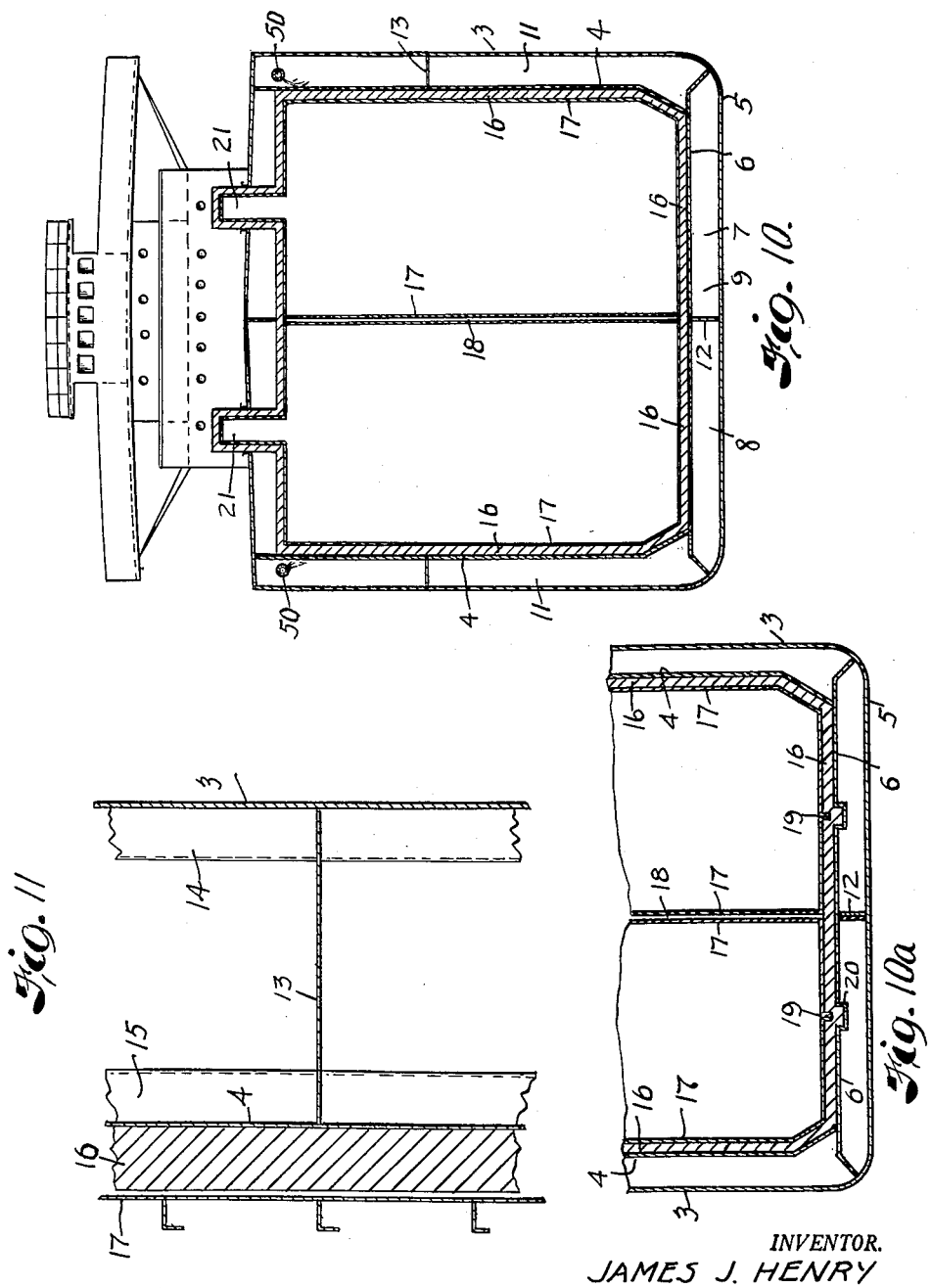

INVENTOR.
JAMES J. HENRY

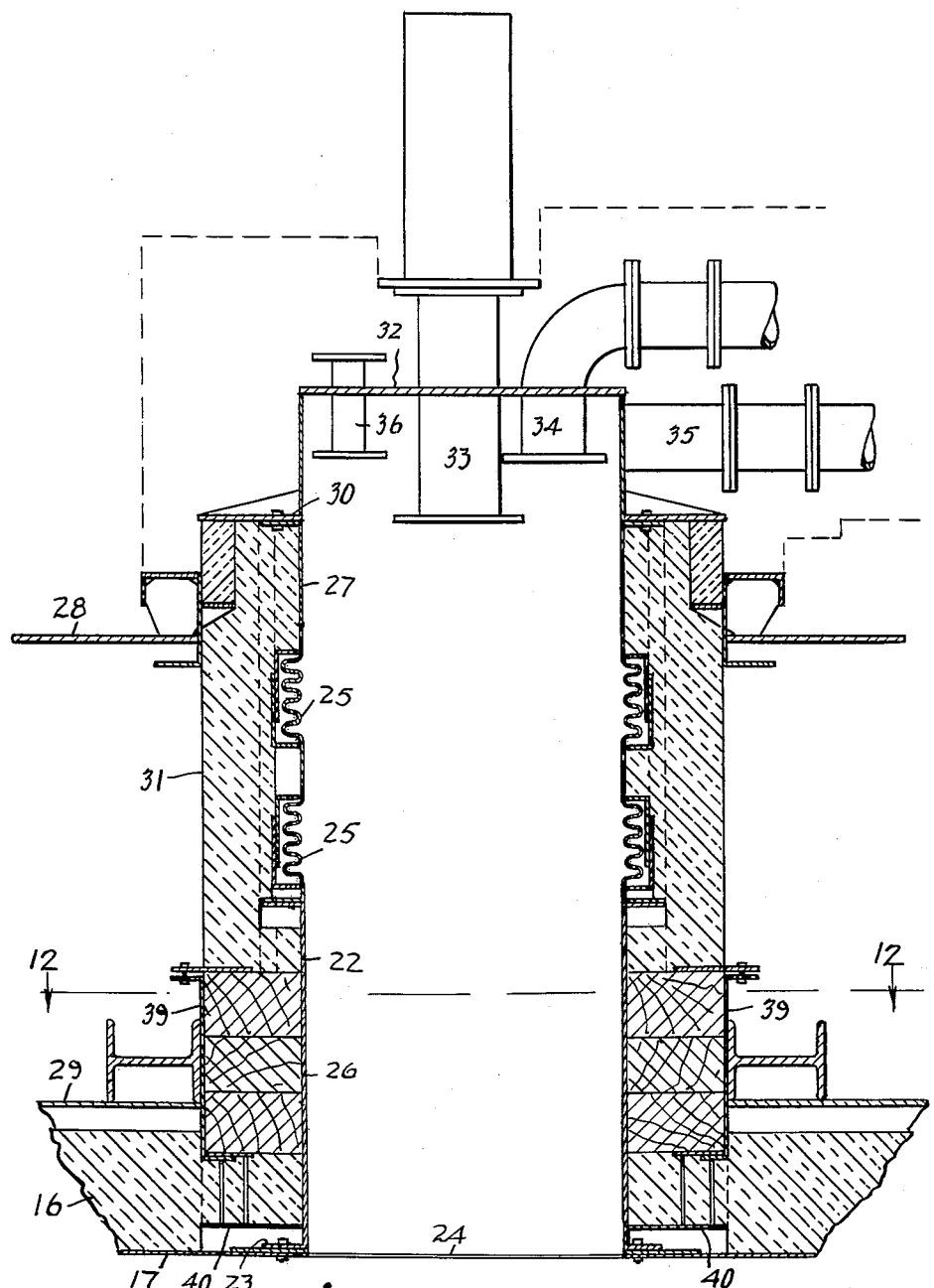

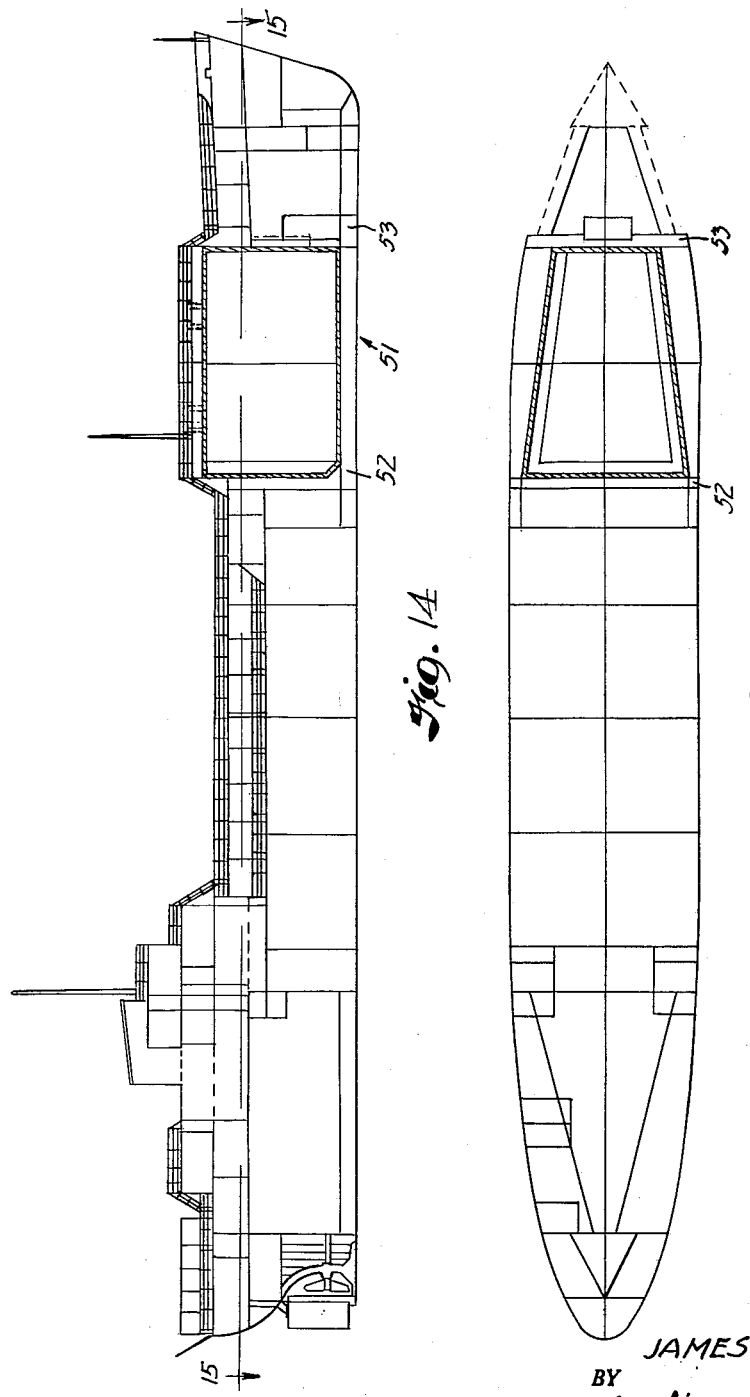

Feb. 20, 1962  J. J. HENRY  3,021,808
SHIP

Filed May 7, 1956  9 Sheets-Sheet 9

INVENTOR.
JAMES J. HENRY
BY
Oberlin & Limbach
ATTORNEYS.

United States Patent Office 3,021,808
Patented Feb. 20, 1962

3,021,808
SHIP
James J. Henry, Short Hills, N.J., assignor, by mesne assignments, to Conch International Methane Limited, Nassau, Bahamas, a corporation of the Bahamas
Filed May 7, 1956, Ser. No. 582,965
5 Claims. (Cl. 114—74)

This invention relates as indicated to ships and more especially to ships designed especially for the transportation of liquid cargo which needs to be maintained at a temperature substantially below zero and at substantially atmospheric pressure.

While a ship constructed in accordance with the principles of this invention may be used for the purpose of transporting a wide variety of different types of liquid cargo which need to be maintained at an extremely cold temperature in order to be liquid at atmospheric pressure, the present invention will be described with more particularity with respect to the transportation of liquefied natural gas or substantially pure methane which is a liquid at substantially atmospheric pressure at temperatures below minus 258° F.

Since it will be remembered that the storage on land of liquefied natural gas at substantially atmospheric pressure has resulted in at least one major catastrope due to failure of the structure supporting the storage container, some of the problems incident to the design of a ship for safely transporting this same material will be appreciated.

In hauling liquefied natural gas or methane at substantially atmospheric pressure, hereinafter for convenience referred to as "the cargo," some of the unusual factors which arise may be enumerated as follows: the cargo should be maintained at substantially atmospheric pressure since the use of vessels with walls strong enough to maintain the cargo under super-atmospheric pressure of any substantial degree would so materially add to the dead weight of the ship as to make such a construction economically unattractive. Means must be provided for preventing too great a transfer of heat from the surrounding sea and atmosphere from penetrating to the cargo and vaporizing it. The hull of the ship must be thermally insulated from the cargo so that the latter will not refrigerate the members of the hull, when made of steel, which are required to carry structural stresses; otherwise the ship will be unsafe. The tanks or the like within which the cargo is contained should be capable of being hydrostatically tested before assembled in the ship in order to insure that they are structurally sound. The specific gravity of the cargo is relatively light so that the relative proportions of the ship should be such that the maximum volume of cargo can be accommodated while at the same time not detracting from the seaworthiness of the ship. While the tanks or containers for the cargo must be thoroughly thermally insulated so as to prevent undue evaporation of the cargo in transit, nevertheless means must be provided whereby access to such tanks can be had for rapid loading and unloading thereof. Since the individual tanks for the cargo will during loading and unloading and at other times be subjected to severe temperature gradients over different areas or throughout different portions thereof, their placement in the vessel must be such that while they are adequately supported against damage during the voyage, nevertheless they dare not subject the structure of the hull to substantial stresses due to the occurrence of temperature gradients.

It is among the principal objects of this invention to provide a ship structure which will satisfy all of the foregoing requirements. Other objects of the invention will appear as the description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

FIG. 1 is a diagrammatic plan view of a ship showing one embodiment of this invention.

FIG. 2 is a vertical section of the ship shown in FIG. 1 taken on the vertical plane substantially indicated by the line 2—2.

FIG. 3 is a horizontal section of the ship illustrated in the previous figures taken on the plane substantially indicated by the line 3—3 in FIG. 2.

FIG. 4 is a schematic diagram of the bottom of the hull of the ship illustrating one form of piping arrangement for the filling and emptying of the various tanks in the ship structure which surround the cargo space and by which proper ballast may be provided as well as a blanket of a heat exchange medium by which the ship structure is insulated against over-refrigeration from the extremely cold cargo.

FIG. 5 is a fragmentary vertical section of a portion of the ship structure shown in FIG. 4 illustrating somewhat more specifically the arrangement of the piping.

FIG. 6 is an illustration generally similar to FIG. 4 but showing a piping arrangement whereby the heat exchange fluid which serves the additional function of ballast may be circulated throughout the several tanks which surround the cargo spaces so as to further insure that the structure of the ship will not be unduly refrigerated by the cargo.

FIG. 7 is a view generally similar to FIG. 5 but illustrating in certain detail the modified from of piping arrangement in FIG. 6.

FIG. 8 is a fragmentary plan view of the rear deck of the ship showing the pumping and associated apparatus by which the temperature modifying and exchange medium which also serves as ballast may be pumped into and out of and circulated through the tanks which surround the cargo spaces.

FIG. 9 is likewise a fragmentary plan view of a portion of the deck in the forward part of the ship showing the pumping and allied apparatus by which the non-cargo carrying spaces of the ship may be kept dry.

FIG. 10 is a diagrammatic transverse sectional view of the ship illustrated in the previous figures taken on a transverse plane at about midship.

FIG. 11 is a fragmentary sectional view of a portion of the side structure illustrated in FIG. 10 drawn to an enlarged scale.

FIG. 10a is a diagrammatic representation similar to FIG. 10 showing a modified form of construction of this portion of the ship.

Figure 12:
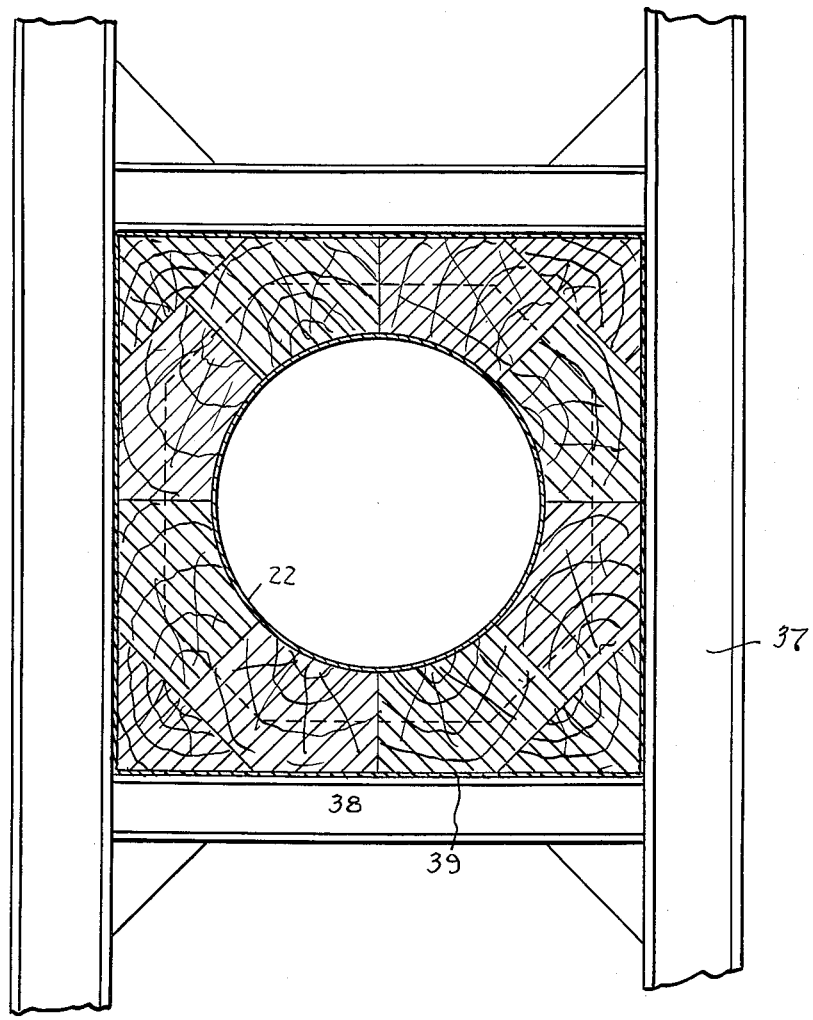

FIG. 12 is a transverse sectional view of the dome which extends upwardly from each of the cargo tanks through the deck of the ship and through which dome the cargo may be loaded and unloaded, this figure illustrating the manner in which such dome is not only laterally supported by the deck structure but also thermally insulated.

FIG. 13 is a vertical section through the loading and unloading dome associated with each of the cargo tanks illustrating in more detail the manner in which such dome is insulated and provided with means for compensation for thermal expansion and contraction of the metal portion of the dome and placement of the loading and unloading conduits.

FIG. 14 is a side elevation partially in section of a ship embodying certain of the principles of this invention but being a form of construction which is alternative to that illustrated in FIGS. 1 to 3 for example, FIG. 14 being a ship structure which may be produced by readily modifying a now commonly built form of ship known as a T-type tanker which is used for the transportation of petroleum and like products.

FIG. 15 is a horizontal sectional view of the ship illustrated in FIG. 14 taken on a horizontal plane substantially indicated by the line 15—15.

Figure 16:
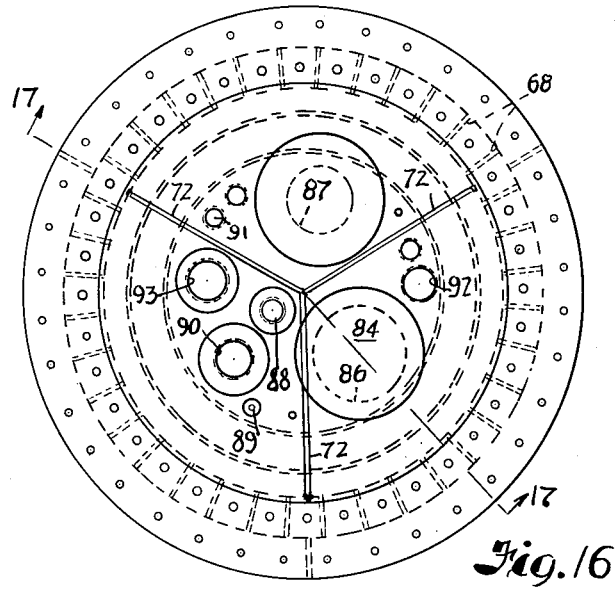

FIG. 16 is a plan view showing an alternate form of construction of the dome which is associated with each of the storage tanks 17.

Figure 17:
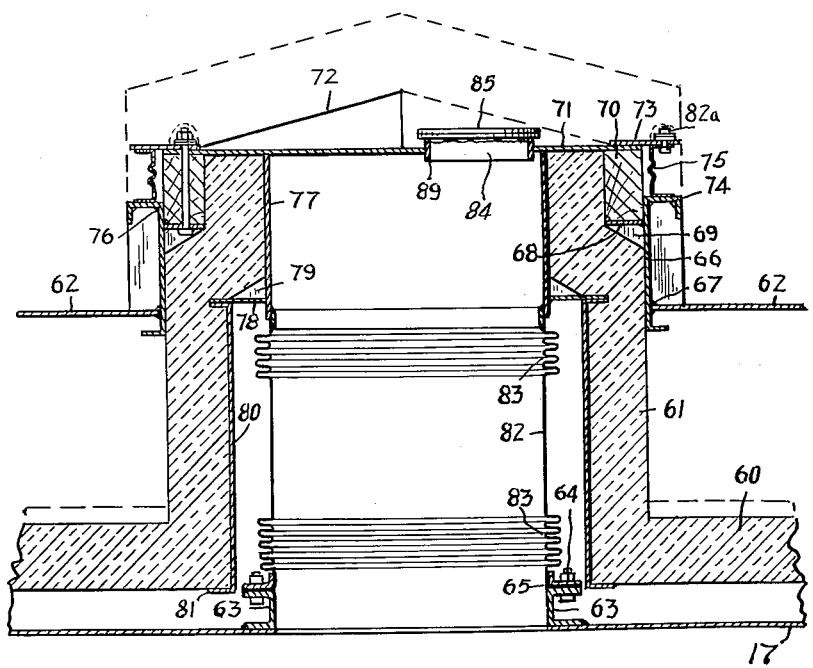

FIG. 17 is a transverse sectional view of the dome illustrated in FIG. 16 taken on the plane substantially indicated by the line 17—17.

Figure 18:
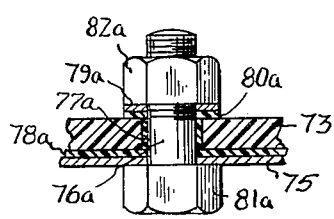

FIG. 18 is a fragmentary sectional view showing the particular type of bolt and gasket construction which is used at several points in the assembly illustrated in FIG. 17.

Referring now more specifically to the drawings and more especially to FIGS. 1 to 3, the ship here illustrated as an embodiment of this invention has one pronounced characteristic which is quite different from other ships of this type which have been previously built. The ship of the present construction has a depth to beam ratio of about 1:1.1. This unusual depth to beam ratio, which provides a substantially square cross-section of the ship amidships as illustrated in FIG. 10 and which is novel particularly with regard to its unusual depth, is desirable and practical for the following reasons. In the first place, the increased depth as compared with the beam is desirable from the standpoint of providing maximum cargo space for the liquefied low specific gravity material without any substantial sacrifice on the speed and navigability of the ship. The ship of the present design will, as previously indicated, need to have some means of thermally insulating the extremely cold cargo from the stress carrying hull of the ship. While this thermal insulation is accomplished in part by fixed thermal insulation layers surrounding the cargo holds wherein the cargo tanks are contained, nevertheless as a further safeguard the ship is provided with wing tanks which completely surround the sides of such cargo spaces and extend upwardly to the deck. These wing tanks will at all times contain some ballast. When the cargo tanks are full it is necessary that the wing tanks be at least partially filled with ballast such as sea water or fresh water and most desirably such ballast will be either constantly replenished or recirculated so as to insure that there will be no temperature gradients set up in the load-supporting shell of the ship. The fact that these ballast tanks will be at least partially filled at all times, even when the ship is fully loaded, makes practical the unique depth to beam ratio which characterizes this design.

The hull of the ship is generally indicated at 1 and extending thereacross at spaced intervals in accordance with conventional ship design are a plurality of cofferdams generally indicated at 2. Before proceeding further with the detailed description of this invention, it may be well to note that in the drawings the customary structural bracing members usually employed in ship construction have been omitted in order not to unduly obscure the essential features of construction sought to be illustrated by the drawings. It is believed unnecessary to show such structural bracing members since in this particular the present structure employs conventional practice.

It should be pointed out, however, as most clearly illustrated in FIG. 10, that aside from the transversely extending cofferdams 2, the cargo space within the hold of the ship is otherwise unobstructed. Thus, the shell of the hold consisting of the outer skin 3 and an inner skin 4 suitably cross-braced provide the necessary structural strength for the hull between the cofferdams. Similarly, a conventional bottom generally indicated at 5 has a secondary bottom generally indicated at 6 associated therewith to provide a space 7 along the bottom of the ship which is subdivided into a plurality of bottom tanks 8 and 9. The double-walled sides of the ship are subdivided by means of fluid-tight spacers generally indicated at 10 whereby the double-walled sides of the ship are subdivided into a plurality of wing tanks generally indicated at 11.

The bottom space 7 below the cargo spaces is subdivided longitudinally of the hull by partition 12. That partition 12 cooperating with the cofferdams 2 subdivides the bottom of the ship, that is, the space 7 into a plurality of independent bottom tanks as most clearly referred to hereinafter in connection with the description of FIGS. 4 to 7 inclusive.

The wing tanks may have a horizontal partition 13 as most clearly illustrated in FIGS. 10 and 11 therein extending between the outer skin 3 and the inner shell 4 of the hull. The plate 13 may be perforate or imperforate depending on the particular type of system used for the purpose of preventing the refrigeration of the hull structure by the temperature transferring liquid medium used in the wing tanks generally.

In FIG. 11 the member 14 is a structure reinforcing member of conventional design associated with the outer skin 3 of the hull. The structural member 15 is of conventional design associated with the inner shell 4. Actually additional cross-bracing members would be present in the final construction but as previously indicated these have been omitted in order that they not obscure the essential elements of the structure which characterizes the ship of this invention. The layer 16 is a layer of insulating material and the element 17 is a portion of the cargo tank to which more specific reference will be had hereinafter.

In the embodiment of the invention illustrated in FIGS. 1 to 3 and 10, for example, the cargo storage tanks are generally indicated at 17. In the embodiment of the invention shown in FIG. 3 there are six of such individual tanks in each of the hold spaces between adjacent cofferdams. These individual tanks 17 are preferably formed of aluminum, or more particularly an aluminum alloy of about the following composition:

| | |
|---|---|
| Magnesium, percent | 3.1 to 3.9 |
| Chromium, percent | 0.15 to 0.35 |
| Copper, max, percent | 0.10 |
| Zinc, max, percent | 0.20 |
| Iron plus silicon, max, percent | 0.45 |
| Manganese, max, percent | 0.10 |
| Other, each, max, percent | 0.05 |
| Other, total, max, percent | 0.15 |
| Aluminum, remainder. | |

The American Society of Mechanical Engineers has the following designation for this alloy: Alloy GR40A Specification SB–178.

This material has the very desirable property of not having its physical properties substantially impaired when the temperature thereof is reduced to about minus 258° F. A decided advantage accrues from the proportioning of the sizes of the tank 17 so that six may be placed in each cargo space between the cofferdams. The use of six individual tanks in each such space has many advantages. Most efficient use is made of the insulation in the cargo space when this number of tanks is used and when such number is used in a ship having a depth to beam ratio of 1 to about 1.1 each of such tanks will have the most desirable configuration from the standpoint of height and cross-section. The specific design construction of these individual cargo tanks forms no part of the present invention. It is believed sufficient to state that they are prefabricated and provided with internal cross-bracing so that they are self-supporting and may be hydrostatically tested with the equivalent of a full cargo before they are assembled in the ship. Such preliminary testing is necessary in order to insure that there will be no leaks in the cargo tanks after they have been assembled in the ship. The fact that the tanks 17 are about twice as high as they are wide is an important feature in that when this proportion is maintained then the problem of most economically constructing a self-supporting tank which may be pre-tested hydrostatically is greatly simplified.

When the ship is initially built the double-walled sides in cooperation with the cofferdams makes it possible to extend the inner shell 4 to the deck level and to thus provide an unobstructed cargo space between the cofferdams into which the tanks 17 may be lowered after they have been preliminarily tested. The inner surface of the side and bottom plates 4 and 6 have applied thereto a substantial layer of a thermal insulation material 16. It is essential that such insulation material be rigid, i.e., non-settling, so that the tanks may be assembled in the hold space with a slight clearance between the outer walls of the tank 17 and the insulation 16 in the manner illustrated in FIG. 11. This feature is desirable for the reason that in this way flexure of the hull of the ship in heavy seas will not result in a substantial flexure of the tanks 17. No thermal insulation is required in the slight space 18 which is desirably left between the individual tanks themselves. It may be found helpful, however, to include in such space 18 a material which is substantially unaffected at the low temperature encountered in these areas, which material has the property, however, of preventing scuffing between the adjacent surfaces of adjacent tanks. The inclusion of a layer or film of "Teflon" (polytetrafluoroethylene) in space 18 will be found desirable for this last named purpose.

The insulating layer 16 may be formed entirely of a single thermal insulating material or from a lamination of a plurality of such materials. A material admirably suited for such insulating layer is balsa wood. Since balsa wood is available only in pieces of limited cross-sectional area, the layer 16 if made of such wood will be built up of a plurality of pieces cemented together. Balsa wood is admirably suited for this purpose because it possesses not only excellent thermal insulating properties but also is able to provide substantial structural support for the tanks 17. In order to prevent chafing of the relatively fragile inner face of the insulating layer 16 there may be applied to such face adjacent the tank 17 a layer or lamination of a stronger material such as a hard wood or a layer of other abrasion resistant material.

The use of balsa wood as the insulating layer 16 is desirable for many reasons. One of such is that balsa wood even though laminated is sufficiently porous that if a tank 17 should develop a leak in a local area the liquefied methane will progress outwardly through the capillaries of the balsa wood and appear as a cold spot on the inside of the shell 4. The occurrence of such a cold spot can be readily detected and when balsa wood is used it will be in close proximity to the area where the tank 17 has developed the leak and accordingly the location of any such leak can be quickly and accurately determined.

It may be desirable to provide some means for anchoring the tanks 17 against lateral shifting on the bottom of the ship. This may be accomplished by providing a single or transversely intersecting ribs 19 on the bottom of the tank 17 which are received in complementary recesses in the bottom layer of insulation and if desired the bottom shell 6 may have a groove 20 formed therein coinciding with such recess in the insulation so as to make possible a uniform layer of insulation even in the area where such ribs from the bottom the tank extend into the insulating layer.

As previously indicated each of the individual tanks 17 must be provided with a dome extending upwardly through the deck through which such cargo tanks may be filled and emptied. Such domes generally indicated at 21 in FIG. 10 are more clearly illustrated in FIGS. 12 and 13. The metal portion of the dome 21 is in the form of a cylinder generally indicated at 22 which is provided with a radial flange 23 along its lower edge and the diameter of the cylinder 22 is such as to be about equal to an opening 24 formed in the roof of the tank 17.

Intermediately of its ends the cylinder 22 is provided circumferential corrugations 25 as illustrated in FIG. 13 which provide for relative axial movement between the lower portion 26 of the cylinder 22 and its upper portion 27. Temperature changes may occur which will result in an elongation or contraction of the cylinder 22 since the latter is anchored as at 23 to the tank 17 and as at 30 to a portion which is inflexible with respect to the deck structure.

A layer of insulation generally indicated at 31 is built up around the periphery of the cylinder 22 as a substantial continuation of the insulation 16 which encompasses the tank 17 so that transfer of heat into the cylinder 22 laterally is substantially precluded.

The upper end of the cylinder 22 is closed by means of a plate 32 and connected to the interior of the cylinder 22 are three conduits 33, 34 and 35 respectively.

The conduit 35 provides an overflow line through which excess cargo in the tank may be discharged to a safe point in the event of overfilling and the like. The conduit 36 leads to a relief valve by which the pressure in the tank 17 is maintained at substantially atmospheric at all times since some pressure ordinarily will build up in such tank as the liquefied methane therein evaporates due to some progression of heat through the ship structure and insulation layer into the body of cargo. Such relief line will, of course, be provided with a valve which will automatically open when the pressure in the tank exceeds a predetermined value such as about 1 pound or less. Such relief valves and safety precaution measures which may be required in conjunction with the line 36 form no part of the present invention and are accordingly not specifically illustrated.

The conduit 34 provides the means whereby the liquefied methane is charged into the hold or tank 17 when the ship is being loaded. The conduit 33 extends as an open conduit downwardly into the cylinder 22 to provide an opening through which may project the driving means, controls, etc., as well as the actual discharge conduit through which the cargo is unloaded usually by means of a submerged pump located at the bottom of the tank 17.

The tank 17 has no opening therein other than that provided by the cylindrical dome 22. This is a highly important factor from the standpoint of safety. The pressure relief conduit 36 in the lid 32 of the dome provides a means for venting to the atmosphere any undue pressure accumulations which may occur in the tank 17. The tank 17 being prismatic may not have built up therein any substantial amount of pressure without the danger of disrupting the walls and corners thereof.

In the area immediately around each dome 22 the deck structure of the ship has transversely extending structural members 37 as most clearly illustrated in FIG. 12 which extend across the ship on opposite sides of each of such domes. Crossmembers 38 connected to the members 37 form a substantially rectangular space within which is positioned a similar rectangular metallic structure 39 which is at its lower edge interconnected with plates 40 embedded in the insulation layer 16 closely embracing the sides of the cylinder 22 and movable relative thereto. The plate 40 is movable with respect to the lower portion 26 of the cylinder 22. In this way the rectangular metal frame 39 with its contained insulation around the cylinder 22 anchors such cylinder, and consequently the tank with which the latter is connected is braced against lateral shifting. This lateral support of the tank 17 at the top coupled with the lateral support given to such tanks by the flanges 19 at their bottom will be sufficient to prevent the tank 17 from shifting during the voyage.

The structure shown in FIG. 13 is characterized in that the upper portion of the dome is rigidly fixed to the deck so that the weight of the dome is carried chiefly by the deck 28 so that little, if any, of such weight rests on the top of the tank.

FIGS. 16 and 17 disclose an alternate form of construction in which the insulation 60 which extends over the tops of the tanks 17 and also that portion of the insulation indicated at 61 which extends upwardly around the dome are all supported from the top of the main deck generally indicated at 62 so that the top of the tank carries no weight whatsoever since the insulation and all of the dome structure are supported from the deck. In this construction as most clearly illustrated FIG. 17 the opening centrally of the top of the tank 17 which leads into the dome is reinforced by an annular U-shaped ring 63 which is preferably made of the same aluminum alloy as that from which the tank is constructed. An annular member 64 of angular cross-section is bolted into the upper leg of the member 63 by means of a bolt arrangement like that illustrated for instance in FIG. 18 and which will be described in greater detail at a later point. Interposed between the members 63 and 64 is a non-metallic gasket member generally indicated at 65 which serves as a thermal barrier against the conduction of heat from the member 63 to the member 64. The gasket member 65 may be made of any suitable gasket material such as a phenolic resin or the like.

Extending around the opening in the main deck 62 through which the dome projects is an annular member generally indicated at 66 which is of substantially U-shaped cross-section and is welded to the main deck plate as at 67. Around the inner periphery of the member 66 near its upper edge is an annular plate generally indicated at 68 which is provided with reinforcing brackets 69 at spaced points around the inner periphery of the member 66.

Resting on the member 68 is an annular block of wood 70 which is held in place by that portion of the annular member 66 which extends above the level of the annular plate 68. Resting on top of the wood member 70 is the cover plate 71 which is substantially flat but which has three radially extending upstanding ribs 72 thereon as most clearly illustrated in FIG. 16 for the purpose of providing strength to such member.

Welded to the periphery of the plate 71 is an annular stainless steel plate 73 which projects radially outwardly of the edge of the plate 71 and is thus in overlying relation with the upper leg 74 of the member 66. Interposed between the thus projecting upper edge of the annular plate 73 and the leg 74 of the member 66 is a U-shaped stainless steel channel generally indicated at 75 which has its opposite legs bolted to the members 73 and 74 respectively and intermediately of its ends is provided with corrugations to permit flexure as such may occur due to stresses imposed either by load or by temperature changes.

The plate 71 is held on the dome by means of bolts such as 76 which are circumferentially spaced around the periphery of the plate 71 and are at their lower ends supported by the plate 68 through which they pass.

Welded or otherwise secured to the lower face of the plate 71 is a cylindrical member 77 preferably formed of stainless steel. Adjacent its lower edge and on its outer periphery the cylinder 71 has a radially extending flange 78 secured thereto as by welding, with the juncture between 77 and 78 reinforced with brackets 79 arranged at about 30° intervals around the outer periphery of the cylinder 77.

At its outer edge the annular plate 78 has secured thereto as by bolts, presently to be described, a cylindrical member 80 which at its lower edge is provided with a radially outwardly extending flange 81 by which the layer of insulation over the tank and around the dome is carried so that the weight thereof is supported through the dome structure on the main deck plate 62 and does not rest on the top of the tank.

Extending between the lower edge of the cylinder 77 and the top edge of the annular bracket 64 is a stainless steel cylinder generally indicated at 82 which is provided with folds or corrugations 83 at axially spaced points in its periphery to provide for elongation and contraction of the cylinder 82 as this may be necessary in order to compensate for expansion and contraction due to temperature changes. In FIG. 16 are shown the various openings provided in the plate 71. Each of these openings are in the form of an annular member such as 84 extending through the plate 71 and provided with a reinforcing radially extending flange 85 to which conduits or equipment bases may be secured. In having reference to FIG. 16 the inner diameter of each of the circles denoting the inside diameter of the flange corresponding to 84 will be referred to for convenience. 86 is a manhole having a diameter on the order of about 18 inches through which the interior of the tank may be inspected or through which various instrumentalities may be lowered for inspection or similar operations in the tank.

87 is the opening provided for the lowering into the tank of a deep well pump which will generally rest on the bottom of the tank and by which the cargo in the tank may be pumped out. 88 is an opening to accommodate an instrument which will indicate the liquid level in the tank. 89 denotes the provision of means for supporting the control by which the deep well pump may be turned on and off. 90 denotes an opening to which a vapor relief line may be connected in order to insure, as previously indicated, that the pressure within the tank is always substantially atmospheric. 91 denotes an opening to which may be connected a vapor outlet conduit through which the vapor generated in the tank by boiling of the cargo due to penetration of heat into the cargo will be carried off to be used as fuel in the engine propelling the ship.

92 denotes the connection by which the inflow conduit for filling the tank may be connected to the manhole so that the liquid cargo will be charged into the tank at this point. 93 denotes a support in which may be mounted fill line control apparatus for the purpose of controlling the filling of the tank.

Other connections to adapt the ship to particular filling discharge apparatus may be employed as well as such other devices as may be necessary for the purpose of insuring the various safety measures which, of course, must be observed in equipment of this kind.

In FIG. 18 there is illustrated a representative type of bolt such as is used throughout the dome as most clearly illustrated in FIG. 17. Let it be assumed that the illustration in FIG. 18 is the bolt at the upper right hand corner of FIG. 17 by which the upper leg of the stainless steel channel 75 is secured to the plate 73. The hole through the members such as 73 and 75 to be secured together will be slightly larger than the shank or stem 76a of the bolt. Surrounding the stem 76a of the bolt in such enlarged opening is a bushing 77a of suitable insulating material such as a phenolic resin. Interposed between the two members 73 and 75 is a gasket 78a of similar material and under the steel washer 79a is a similar washer 80a likewise of insulating material. The bolt is, of course, provided with the usual enlarged head 81a and the threaded nut 82a which is threadably secured on the stem 76a of the bolt.

As previously indicated, means must be provided for preventing the extremely cold cargo from refrigerating the load carrying structure of the ship so that such structure will not have its strength adversely affected. In order to insure that the hull structure of the ship will be at all times kept at the proper temperature in the event the layer of insulation 16 is by itself inadequate for that purpose for any reason whatsoever, the wing and bottom tanks of the ship may be provided with means for heating the hull structure. It is within the contemplation of this invention to provide thermocouples located at various strategic points on the hull from which leads will extend to instruments at a central location so that the temperature of the hull in various areas may be constantly determined. The illustration in FIGS. 4 and 5 is a diagrammatic representation of one form of piping means by which the various wing and bottom tanks of the ship may be filled with ballast which will serve as a thermal conducting means so that if the inner shells 4 and 6 should become unduly cold such thermal conducting medium being in contact with the outer shell of the hull will effect a heat exchange with the sea and air surrounding the ship so that the inner shell 4 and 6 will never be at a dangerously low temperature. In FIG. 4 there are illustrated two lines or conduits 41 and 42 extending from a central pumping station 43 along opposite sides of the hull forwardly of the ship. Each of these lines has a branch line connected therewith which leads respectively into each of the wing and bottom tanks. The terminals of these branch lines which extend into the wing tanks are indicated by the reference character 44. Each of the terminals of the line extending into the bottom tanks are indicated by the reference characters 45. Branch lines may also lead into the cofferdams and the terminals of such lines are indicated by the reference characters 46. A separate line will lead to each of the cofferdams and each of the wing tanks as well as each of the bottom tanks. The pumping arrangement by which the individual tanks may be filled or emptied is illustrated in FIG. 8. This is conventional in ballast systems for ships and forms no part of this invention, that is, the precise arrangement and driving means for the pumps and valves by which the several lines are controlled. Accordingly, the individual components of the system as illustrated in FIG. 8 will not be described in detail. Similarly, the forward or storage hold portion of the ship may be provided with bilge lines terminating at 47 and the pumping system for those lines is illustrated in FIG. 9. Such system likewise forming no part of the present invention will not be described in any greater detail.

The arrangement of the lines illustrated in FIG. 4 is illustrated somewhat more clearly in FIG. 5 wherein conventional symbols for valves and terminals commonly used in ship architecture drawings are utilized.

For greater safety and in order to absolutely insure that the structural portion of the hull will always be protected from undue refrigeration by the cargo, a piping system like that illustrated in FIGS. 6 and 7 should be used. In FIG. 6 the piping system consists of two lines 48 and 49 respectively extending forward from a pumping station aft of the ship. The line 48 is the suction or discharge line and the line 49 is the supply line. The suction nozzles associated with the ends of the branch lines leading from the suction line 48 in each of the wing tanks are designated by the reference character 48a and the suction heads on each of the branch lines leading from the line 48 to the bottom tanks are designated by the reference character 48b. The suction terminals of the branch lines leading from the line 48 into the cofferdams are designated by the reference character 48c. The terminals of the branch lines leading from the supply line to each of the wing tanks is designated by the reference character 49a. The terminals of the branch lines leading from the supply lines 49 to each of the bottom tanks is designated by the reference character 49b and the terminal of each of the branch supply lines extending into the cofferdams are designated by the reference character 49c.

By means of the piping arrangement illustrated in FIGS. 6 and 7 it is possible to very accurately control the temperature of the liquid in the bilge tanks at the bottom and sides of the ship. In many instances a recirculation of the same liquid will be sufficient for the purpose of maintaining adequate temperature control so that the inner shell of the ship 4 does not become unduly refrigerated. Other times it is possible by the piping arrangement shown in FIGS. 6 and 7 to continuously circulate fresh sea water through the several bilge tanks for the purpose of maintaining adequate temperature control.

In FIG. 10 there have been illustrated conduits 50 extending lengthwise of the ship in the upper portions of each of the wing tanks with nozzles associated with each whereby a spray may be projected against the upper surface of the shell 4 in each of such wing tanks so that a curtain of liquid will flow downwardly over the shell 4. The conduits 50 may conveniently be connected to the same source of supply as the conduits 49 or a separate supply of fresh water may be utilized for circulation through the conduit 50 in which event a simple independent recirculating system for such water would be provided.

At this point it may be well to point out that it is within the contemplation of this invention to provide a partition such as 13 in the wing tanks and to have such partition which is normally utilized as a structural member to be imperforate so as to separate the wing tanks into upper and lower sections. When the members 13 are open providing communication between the upper and lower portions of the wing tanks then the lines 50 may be connected in parallel with the lines 49 or they may replace the lines 49 and thus all of the bilge and ballast water which is used also as a temperature transfer medium between the inner and outer shells of the ship may be sprayed against the outer face of the inner shell 4 whereby the temperature gradient vertically in such shell may be kept at a minimum. When the partition member 13 is imperforate then it will desirably be located at the Plimsoll line. In such case the lower portion of the wing tanks below the partition members 13 may be kept substantially filled with water which will effect a rapid heat exchange between the inner shell 4 to the outer shell 3 and thence to the surrounding sea water. The water curtain delivered to the surface of the outer shell 4 above the partition member 13 may if desired be sea water or a quantity of fresh water may be recirculated in the upper portions of the wing tanks and such water kept at the desired temperature by suitable heat exchangers on board the ship.

It is within the contemplation of this invention also to protect the structural portion of the hull from becoming refrigerated by the inclusion of steam lines in the bottom and wing tank spaces. Such steam lines may be used to supply the heat necessary to maintain the inner shell 4 at the desired temperature either with the tanks empty or filled with water as previously explained.

It will be noted that in the construction shown for purposes of illustration of this invention the space between the deck plates 23 and the insulation overlying the cargo tanks is open. Under ordinary circumstances no means need be provided for the purpose of warming that area since such area will not be refrigerated by the cargo to the extent that the sides and bottom of the ship will be refrigerated. At this point it should be noted again that what has been said with regard to maintaining the inner shell 4 of the hull at a desirably elevated temperature so as to preserve its structural strength applies also to the cofferdams. It will be noted that in the description of the piping diagrams for the circulation of heat exchange medium, provision was made for the heating of the cofferdam structure.

Because of the manufacturing facilites and availability of the raw materials, liquefied methane may be produced in the same locality or by the same manufacturer producing other heavier hydrocarbons which may be moved by water to remote destinations. When this is the case it may be desirable to provide in a single ship accommodations for the heavier hydrocarbons which are normally liquid at atmospheric temperatures and pressures and the liquefied lighter hydrocarbons such as natural gas and methane which can be maintained liquid only at sub-atmospheric temperatures at atmospheric pressures. In FIGS. 14 and 15 there is illustrated a ship which can accommodate both types of products. The ship here illustrated in FIGS. 14 and 15 is basically a T-type tanker of which many are in use hauling petroleum products long distances by water. The structure illustrated in FIGS. 14 and 15 has been modified by following the principles of this invention as previously explained to accommodate as part of its cargo the liquefied lighter material which must be maintained cold. In the area generally indicated at 51 the same being for convenience the area in the ship between the cofferdams 52 and 53 the sides and deck of the ship have been raised to an extent such that in this cross-section the height of the four individual tanks contained in this hold space and which accommodate the cold liquid cargo is such as to be approximately twice the average width. Thus in this modified hold space which similarly to the ship previously described is insulated with a thermal insulating material the four individual tanks have about the same proportional size as the individual tanks used in the ship previously described. It is believed unnecessary to describe the modification of FIGS. 14 and 15 in greater detail since in the construction of the section indicated at 51 the same principles explained in detail previously should be observed insofar as providing for warming of the structure of the hull adjacent the cargo space in which are contained the tanks of the extremely cold cargo.

Other modes of applying the principle of the invention may be employed, change being made as regards the details described, provided the features stated in any of the following claims, or the equivalent of such, be employed.

I therefore particularly point out and distinctly claim as my invention:

1. A ship for the transportation of an extremely cold liquid cargo comprising the combination of an outer hull of a high strength fluid- and vapor-impervious material, an inner hull of a high strength fluid- and vapor-impervious material spaced a short distance from the outer hull and in substantially parallel relationship therewith throughout the major length of the hold space of the ship, a plurality of cofferdams extending cross-wise between the hulls in longitudinally spaced-apart relation, a relatively thick layer of thermal insulating material lining the inner surfaces of the inner hull and the cofferdams to define an insulated hold space therebetween, and cargo tanks mounted within the insulated hold space for housing the cold liquid cargo, and means for stabilizing the positions of the tanks within the hold space while permitting movement relative to the ship's structure in response to expansions and contractions due to temperature change.

2. A ship as claimed in claim 1 which includes a thermally insulated dome extending from each of said cargo tanks upwardly through the deck of the ship, and means for stabilizing the domes relative to the ship's deck.

3. A ship as defined in claim 1 characterized further in that each of the tanks in each of said hold spaces is provided with a thermally insulated dome extending upwardly through the deck of the ship through which the liquid cargo may be loaded and unloaded, and means forming a part of the dome for permitting vertical movements of the tank relative to the ship structure in response to expansion and contraction due to temperature change.

4. A ship for the transportation of an extremely cold liquid cargo comprising the combination of an outer hull of a high strength fluid and vapor impervious material, an inner hull of a high strength fluid and vapor impervious material spaced a short distance from the outer hull and in substantially parallel relationship therewith throughout the major length of the hold space of the ship, a plurality of cofferdams extending crosswise between the hulls in longitudinally spaced apart relation, a relatively thick layer of thermal insulating material lining the inner surfaces of the inner hull and the cofferdams to define an insulated hold space therebetween, cargo tanks mounted within the insulated hold space for housing the cold liquid cargo, a dome extending from each of said cargo tanks upwardly through the deck of the ship, and means for stabilizing the dome relative to the ship's deck while permitting vertical movement of the tank and dome relative to the ship's deck in response to expansions and contractions due to temperature change.

5. A ship for the transportation of a liquid cargo which needs to be maintained at a temperature on the order of minus 258° F. and at substantially atmospheric pressure, the combination of a hull structure having a plurality of transverse cofferdams spaced longitudinally of the hull; fluid-tight compartments, along the sides and bottom of the hull in the hold spaces between said cofferdams providing fluid-tight cargo spaces spaced from the shell of the hull; a thermal insulation material lining each of said cargo spaces; cargo tanks in each of such thermal insulation lined cargo spaces; a thermally insulated dome extending from above each of said cargo tanks upwardly through a deck structure; and including spaced encircling corrugations in a portion thereof and means rigidly joining the upper end portion of the dome to the ship's deck structure whereby relative movement between the dome and the ship is prevented while permitting the tank to move vertically relative to the deck structure in expansion and contraction responsive to temperature change.

References Cited in the file of this patent

UNITED STATES PATENTS

| | | |
|---|---|---|
| 689,782 | Blanchard | Dec. 24, 1901 |
| 991,507 | Hitchfield | May 9, 1911 |
| 1,953,389 | Bolton et al. | Apr. 3, 1934 |
| 2,371,347 | Morrow | Mar. 13, 1945 |
| 2,512,308 | Cooper | June 20, 1950 |
| 2,689,461 | Brandon | Sept. 21, 1954 |
| 2,738,749 | Macy et al. | Mar. 20, 1956 |
| 2,798,364 | Morrison | July 9, 1957 |
| 2,810,265 | Beckwith | Oct. 22, 1957 |
| 2,896,416 | Henry | July 28, 1959 |
| 2,933,902 | Howard | Apr. 26, 1960 |

FOREIGN PATENTS

| | | |
|---|---|---|
| 24,981 | Austria | Dec. 1, 1905 |
| 678,259 | Great Britain | Aug. 27, 1952 |

OTHER REFERENCES

Oil and Gas Journal, Mar. 22, 1954, pages 104 and 105.